United States Patent Office 3,224,896
Patented Dec. 21, 1965

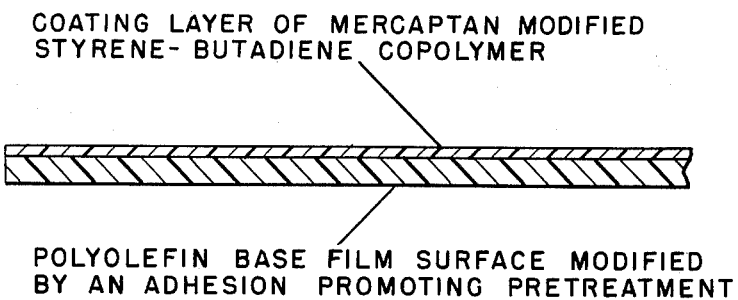

3,224,896
HEAT-SEALABLE POLYOLEFIN PACKAGING FILM
Thomas M. Quinn, Ridley Park, and Edward Barkis, Philadelphia, Pa., assignors to Avisun Corporation, Philadelphia, Pa., a corporation of Delaware
Filed Jan. 8, 1963, Ser. No. 250,013
5 Claims. (Cl. 117—47)

This invention relates to a composite polyolefin base sheet. More particularly, it relates to a polyolefin film having a heat sealable, strongly adhering resinous coating.

It is now well known that oriented polyolefin film, particularly polypropylene film, can not be satisfactorily heat sealed to itself without special treatment. When attempts are made to heat seal untreated oriented film, excessive shrinkage occurs producing an unsightly joint. Coatings of various formulations have been applied to oriented and unoriented polyolefin film in an effort to produce heat sealable film which may be used satisfactorily in conventional cellophane handling and packaging machinery. Adhesion of such coatings to unanchored base film is practically impossible while good adhesion to treated base film is difficult to obtain.

It is a principal object of this invention to provide a tenaciously adhering, heat sealable coating on an anchor-treated, polyolefin base film.

It is another object of this invention to provide a composite film wherein a heat sealable coating firmly adheres to an oriented polypropylene base film.

It is another object of this invention to provide a clear, flexible composite sheet of synthetic resins suitable for use in conventional cellophane packaging machinery.

These and other objects of this invention are accomplished in accordance with this invention which comprises an anchor-treated, polyolefin film from the group consisting of polyethylene and polypropylene and a coating on at least one surface thereof of a resinous copolymer of from 80 to 92% styrene and from 20 to 8% butadiene-1,3 prepared in the presence of from 0.2 to 3.0 parts per 100 parts of monomers of a mercaptan modifier of at least 6 carbon atoms. The preferred modified coating resin of this invention has a styrene-butadiene ratio of 85 or 86 to 15 or 14 respectively.

The drawing illustrates the heat-sealable packaging film provided by the invention.

The polyolefin base films of this invention are prepared from film-forming, orientable polyethylene and isotactic polypropylene resins now well known in the packaging film art. The film may be unoriented, uniaxially oriented, or equally or unequally biaxially oriented. For the purpose of this invention the preferred film is biaxially oriented polypropylene.

The base film must be anchor-treated in order to obtain the proper adhesion between the base film and the coating. Treatment for polyolefin film to increase adhesion of printing inks and coatings are well known. For example, the polyolefin film may be treated with a dilute aqueous or alcoholic solution of a polyalkylenimine as disclosed in U.S. 2,828,237 to Rosser et al. The film may be treated with a saturated sulfuric acid solution of sodium dichromate as disclosed in U.S. 2,668,134 to Horton. Or, the base film may be electrically treated in accordance with the procedure of U.S. 2,864,755 to Rothacker. For the purpose of anchoring a heat sealable coating to the base film, as a general rule, it must be given a more severe treatment with whatever anchoring agent or agency is employed. The need for a more severe anchoring treatment is particularly in evidence when employing an oriented polypropylene film as the base film for this invention. A simple test procedure for determining the anchor strength of an anchor-treated base film is as follows:

A small piece of test film is placed on a horizontal metal plate which is hingedly mounted at one edge to a support. The plate may be inclined in an arcuate path at a uniform rate by hand or by use of a motor driven device. A tangent scale is associated with the test device to show the gravitational component by measuring the angle of inclination of the plate at any point in its path.

Five drops of distilled water (0.04 ml. each) are spaced across the test film. The plate is slowly tilted at a uniform rate and the tangent of the angle is read from the scale when three drops of water have started to move. Three such tests are made for each film sample to obtain an average result.

This test has been shown to have good correlation with the ability of coatings to adhere to the film surface. To meet commercial requirements an oriented base film of this invention should have a rating or tangent reading in the foregoing test of at least 0.75.

The coating composition of this invention is disclosed in U.S. Patent No. 2,611,719 to Borders and is stated to be useful in paints, lacquers and printing inks. In general, the coating comprises a six plus carbon mercaptan modified styrene-butadiene copolymer containing at least 80% styrene. The mercaptan, containing at least six carbon atoms, must be present during the polymerization of the styrene-butadiene-1,3 monomers in an amount of 0.2 part to 3.0 parts per 100 parts of monomers. Examples of these mercaptans include isohexyl mercaptan, octadecyl mercaptan, dodecyl mercaptan, tertiary dodecyl mercaptan, etc. For the preferred resin monomer ratio, from about 1.8 up to 2.5 parts of either dodecyl or tertiary dodecyl mercaptan per 100 parts of monomers is preferred for this invention.

In the production of the coating resin the most practical copolymerization procedure employed, and therefore the preferred method, is emulsion-polymerization. Styrene is first mixed with the mercaptan modifier and emulsified with water and a copolymerization catalyst including, for example, potassium persulfate, benzoyl peroxide, hydrogen peroxide, perborates and percarbonates in amounts up to about 1.0% based on the weight of the monomers. Butadiene is then charged to the emulsion and the reaction mass is heated until the reaction is complete. The aqueous dispersion resulting from the emulsion polymerization may be used directly for the preparation of a latex coating composition for coating the base sheet or the copolymer may be coagulated and the solid product washed and dried for later use in the preparation of a coating lacquer.

Coating lacquers of the styrene-butadiene copolymers are formed by dissolving the resin in organic solvents whose Kauri-Butanol value exceeds 60. The resin is dissolved in the solvent in an amount ranging from about 5 to about 50% by weight. Some examples of suitable solvents include toluene, mixtures of toluene and hydrocarbons, e.g., hexane, xylene, aromatic naphthas, carbon tetrachloride, chlorobenzene, dipentene, cyclohexanone, methyl ethyl ketone, ethyl acetate, butyl acetate, nitropropane, etc. The anchored base film is coated on one or both sides with a lacquer or latex composition by dipping, spraying or the like and the solvent or water evaporated in a conventional manner to produce the composite sheet. Latex coated sheets are generally heated after water removal to fuse the resin particles.

Compatible coating additives and extenders may be incorporated in the coating composition as long as the styrene-butadiene copolymer is present in the finished coating in an amount of at least 50% by weight of the coating. Resin extenders such as p-toluene sulfonamide formaldehyde, other styrene polymers and copolymers, and rosin esters are useful. Slip and block improving additives such as Carnauba Wax and clay dispersions up to about 2% based on the weight of the coating may be used. While these additives and blending agents may be employed it will be understood that the modified styrene-butadiene copolymers per se provides an excellent coating for the base material.

The following example is set forth to demonstrate this invention.

*Example*

A clear, flexible composite film was prepared by applying to a base film a lacquer comprising 15% by weight of a mercaptan modified styrene-butadiene copolymer having a styrene-to-butadiene ratio of about 86 to about 14, 52% by weight of toluene and 33% by weight of hexane. The base film was a biaxially oriented polypropylene film having a thickness of 0.67 mil and pretreated with a corona discharge technique to provide an anchoring surface. The lacquer solvent was evaporated to produce the finished sheet.

The resulting composite film was heat sealed to itself between two heated bars at a temperature of 265° F. for a dwell time of 2 seconds at 10 lbs. pressure. The joint produced was neat and strong in both lateral and transverse directions. A heat seal test was performed on the heat sealed sheet produced as described above, which involved pulling two-inch strips of the sealed sheet apart under a measured force. The force required to separate the joint on the Instron Test apparatus was 350–400 gms.

A tape pull test to measure the adhesion properties of the coating to the base sheet was also conducted with the composite sheet of this example. The test involves pressing a 4-inch by 1-inch cellophane adhesive tape on the coating and then tearing the tape from the coated surface. With this procedure no coating was observed to have been stripped off.

The composite film of this invention has excellent shelf life and produces as good or better heat seals after six months aging as the newly prepared film.

In addition to the excellent adhesion and heat seal properties, the sheets of this invention have several other unexpected properties. For example, it is known that uniaxially oriented films usually have strong heat seals only in the direction of orientation. The composite film of this invention, when utilizing uniaxially oriented base film, has strong heat seals in both the oriented and unoriented directions. Further, it is known that it is usually necessary to heat seal a coated surface to a coated surface in attempting to provide good heat seals for oriented polyolefin film. It has been found that composite sheets of this invention which have coatings on one side only, will provide strong heat seals when a coated side is sealed to an uncoated side.

Styrene-butadiene resins which have not been prepared in the presence of the mercaptan modifier have not been found to be satisfactory coatings for polyolefin base films.

Various changes and modifications may be made practicing the invention without departing from the spirit and scope thereof and, therefore, the invention is not to be limited except as defined in the appended claims.

We claim:

1. A heat-sealable packaging film comprising a polyolefin base film selected from the group consisting of polyethylene and polypropylene which has been subjected to an adhesion-promoting pretreatment, and a heat-sealable coating on at least one side of said base film containing at least a major proportion of a resinous copolymer of from 80–92% by weight of styrene and from 20–8% by weight of butadiene-1,3 prepared in the presence of from 0.2 part to about 3.0 parts per 100 parts of monomers of a mercaptan modifier containing at least 6 carbon atoms.

2. The heat-sealable packaging film of claim 1 wherein the polyolefin base film is oriented.

3. The heat-sealable package film of claim 2 wherein the oriented base film is polypropylene.

4. The heat-sealable packaging film of claim 3 wherein the adhesion-promoting pretreatment is an electrical treatment.

5. A heat-sealable packaging film comprising an oriented polypropylene base film which has been subjected to an electrical corona discharge adhesion-promoting pretreatment, and a heat-sealable coating on at least one side of said base film consisting essentially of a resinous copolymer of about 85–86% by weight of styrene and 15–14% by weight of butadiene-1,3 prepared in the presence of from about 1.8 to 2.5 parts per 100 parts of monomers of a mercaptan modifier containing at least 6 carbon atoms.

References Cited by the Examiner

UNITED STATES PATENTS

| | | | |
|---|---|---|---|
| 2,611,719 | 9/1952 | Borders | 260—23.7 XR |
| 2,948,696 | 8/1960 | Parks | 17—161 XR |
| 3,036,930 | 5/1962 | Grimminger et al. | 117—138.8 XR |

WILLIAM D. MARTIN, *Primary Examiner.*

RICHARD D. NEVIUS, *Examiner.*